Jan. 13, 1970  A. H. RODGERS  3,489,453
PORTABLE CAMPER

Filed Jan. 3, 1968  2 Sheets-Sheet 1

INVENTOR
ALFRED H. RODGERS

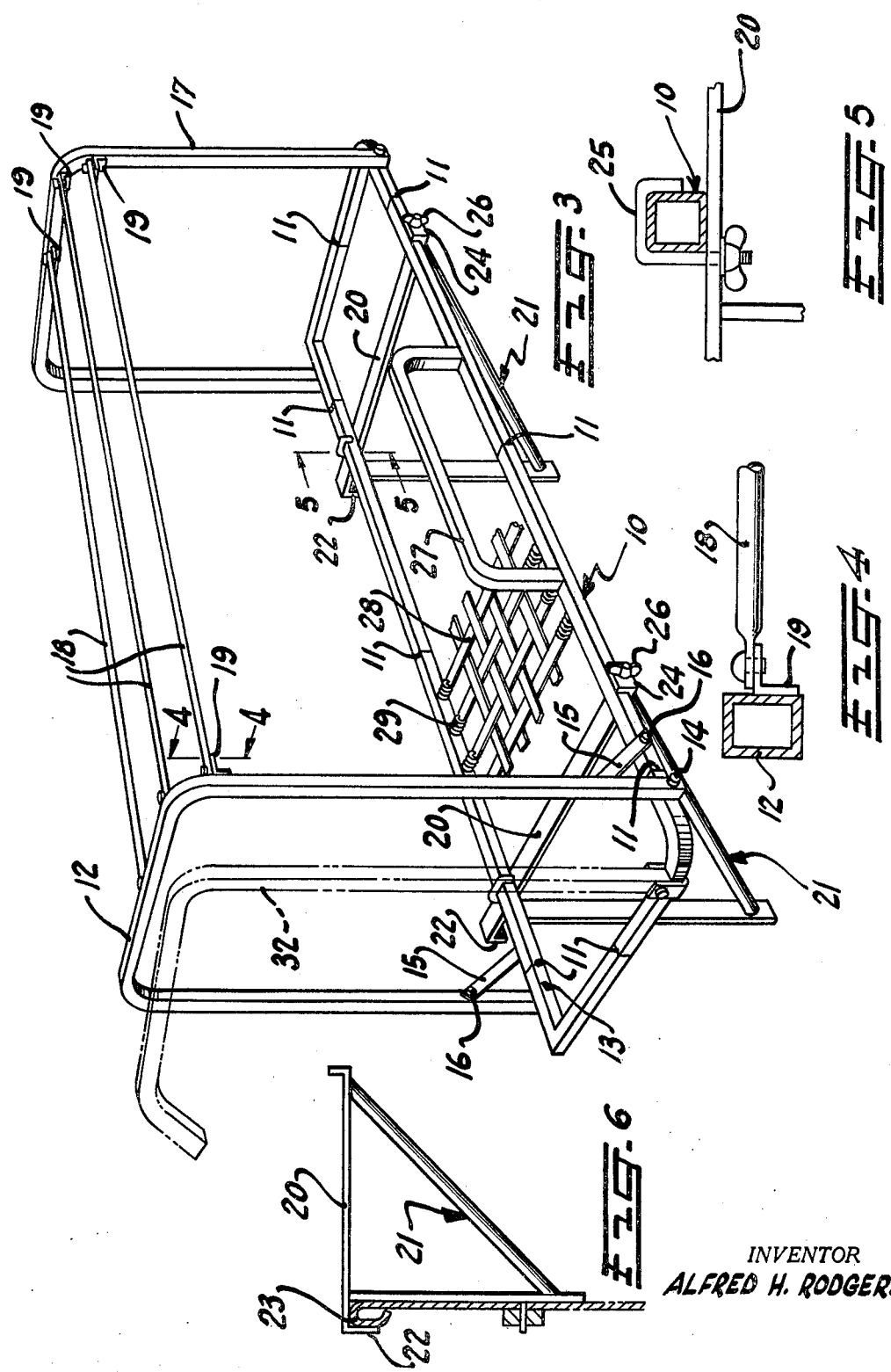

United States Patent Office 3,489,453
Patented Jan. 13, 1970

3,489,453
PORTABLE CAMPER
Alfred H. Rodgers, 1051 E. Homestead Road,
Sunnyvale, Calif. 94087
Filed Jan. 3, 1968, Ser. No. 695,517
Int. Cl. B60p 3/34; A45f 1/00
U.S. Cl. 296—23                                       8 Claims

ABSTRACT OF THE DISCLOSURE

A portable camper unit including a support for each side of a vehicle with the support having means thereon for at least partially enclosing the space thereabove when the support is mounted on a horizontal position extending laterally from one side of a vehicle. The mounting means for each support includes a pair of brackets which are releasably connected to a respective side of the vehicle. The camper unit is collapsible to facilitate storage.

This invention relates to campers; more particularly, to a portable camper adapted to be mounted on a pickup truck. A camper is defined as a "body containing a homelike room that is mounted on a pickup truck." The term camper, as applied to an automobile body, is so recent as not to be found in any known dictionary. The dictionaries define a camper as a person who camps out in a tent or the like.

RESUME OF DISCLOSURE

This invention embodies a plurality of tubes that are preferably square in cross-section. When assembled, these tubes make up two complete rectangular horizontally disposed frameworks to which is swingably secured an inverted U-shaped frame at each end. The two inverted U-shaped frames are connected together at the top by a plurality of spaced and parallel bars. The entire assembly is secured to the top of two triangularly-shaped frames that are hung on the side of a pickup truck or any other vehicle, one triangularly-shaped frame under each end of the aforesaid rectangular framework. The camper consists of two complete framework assemblies, one on each side of the vehicle. Each rectangular framework embodies a flexible metal webbing on which is placed a bedding for one to sleep; and each of the assemblies that go to make up this camper is covered with canvas.

It is the principal object of this invention to provide a portable camper that can easily be mounted on nearly any ordinary pickup truck in a minimum of time and with a minimum of effort.

Another object of this invention is to provide a portable camper of the character herein described that embodies two berths that are located in a longitudinal position, one on each side of a vehicle.

Another object of this invention is to provide a portable camper of the character herein described that can be disassembled, or, as I personally call it, collapsed; to be stored either inside a vehicle or carried on a rack on the side or top of the vehicle.

Still another object of this invention is to provide a portable camper of the character herein described that can be adapted to military or commercial use depending on its internal fitting when the camper is set up for use.

Further objects of this invention will appear hereinafter.

In the drawings:

FIG. 3 is a pictorial view of one of the framework assemblies of this invention.

FIG. 4 is a detailed sectional view of this invention, taken substantially along line 4—4 of FIGURE 3, and viewed in the direction indicated by the arrows.

FIG. 5 is a detailed sectional view of this invention, taken substantially along line 5—5 of FIGURE 3, and viewed in the direction indicated by the arrows.

FIG. 6 is a detail of one portion of this invention. In the several views of the accompanying drawings, like parts are indicated by like reference numbers.

Figure 1:
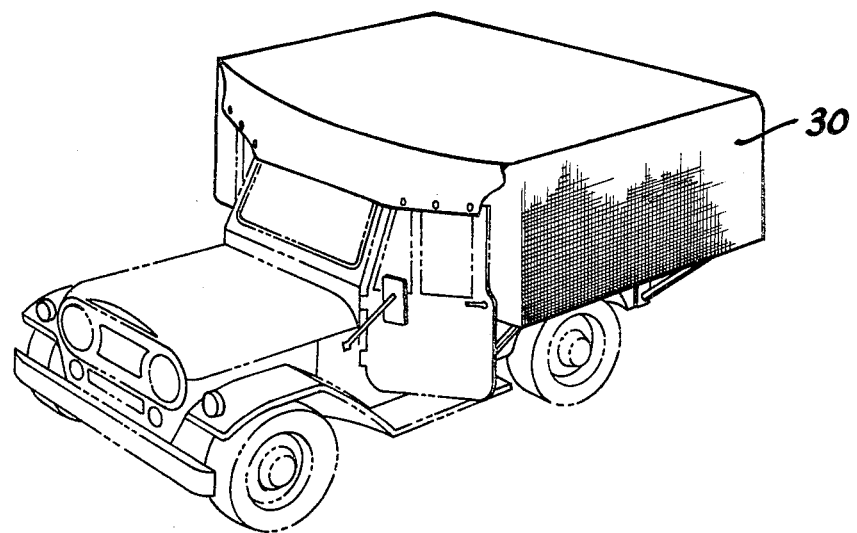
FIG. 1 is a pictorial view of this invention, mounted on a pickup truck ready for use. The pickup truck, shown in phantom lines, is of the jeep type.

Looking first at FIGURE 3 of the accompanying drawings, it will be seen that this invention consists of a rectangular horizontally disposed framework 10 that is made up of a plurality of tubes, square in cross-section, which are suitably connected together at a plurality of locations 11 when this invention is assembled for use. An inverted U-shaped member or frame 12 is swingably connected to one end of the aforesaid framework 10 at 13 by headed bolts or pins 14. When this invention is assembled for use, the just-mentioned inverted U-shaped member or frame 12 is placed in the upright position shown in FIGURE 3 of the drawing. The frame is held by two braces 15 by the bolts or pins 16. When this camper is not in use, the inverted U-shaped member or frame 12 is disconnected from the two braces 15 and swung back under the aforesaid horizontally disposed framework 10. This position of frame 12 is not shown in FIGURE 3 for reasons of clarity. An alike inverted U-shaped frame 17 is likewise secured to the other end of the aforesaid framework 10. The two inverted U-shaped frames 12 and 17 are connected together by a plurality of longitudinally disposed bars 18 whose ends rest on, and are bolted or pinned to, L-shaped brackets 19 that are suitably secured to the often-mentioned inverted U-shaped frames 12 and 17.

Continuing to look at FIGURE 3 of the accompanying drawings, it will be seen that the just-mentioned and described rectangular horizontally disposed framework 10 and its two inverted U-shaped members or frames 12 and 17, along with the plurality of longitudinally disposed bars 18, are placed on top of the outwardly extending members 20 of the two triangularly-shaped and spaced supporting frames 21. Each of these spaced supporting frames 21 is provided with a downwardly extending hook 22 which is placed over the longitudinally disposed edge 23 of a pickup truck or the edge of a window of a sedan or the like. The upturned end 24 of the outwardly extending members 20 prevents the rectangular horizontally disposed framework 10 from sliding off the two triangular supporting frames 21. As an extra precaution, although the rectangular framework is firmly held in place by two inverted U-shaped bolts 25 that are best illustrated in FIGURE 5 of the drawings and by two wing-screws 26 that are screwed into the aforesaid upturned ends 24 of the outwardly extending members 20 of the triangular frames 21, the need was felt to upturn the end 24 of the outwardly extending members 20.

After this invention is assembled in the manner shown in FIGURE 3 of the accompanying drawings, an inverted U-shaped longitudinally disposed frame 27 is suitably mounted on the outward side of the framework 10 in order to prevent one from accidentally falling out of the camper when one is asleep. This frame 27 is particularly desirable when small children are in the camper. The camper is provided with a flexible metal webbing 28 or the like that is secured within the confines of the framework 10 by means of a plurality of small coil springs 29. A suitable bedding is now placed on top of the webbing 26 to complete the camper which is provided with a removable canvas covering 30 or 31, shown only in FIGURES 1 and 2 of the accompanying drawings. The canvas coverings contain as many windows or the like as one may desire. The windows, which can be of any desired shape and material, are a matter of the personal taste of the manufacturer.

Figure 2:
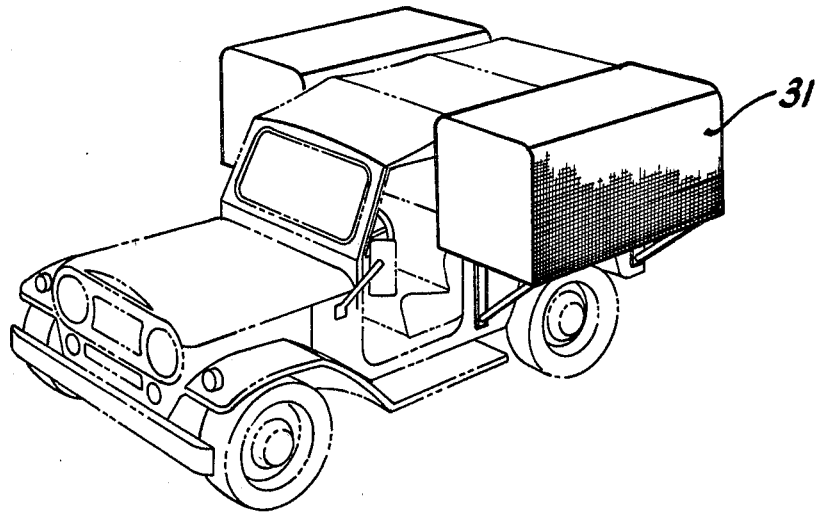
FIG. 2 is a pictorial view of a slightly modified form of this invention, mounted on a pickup truck ready for use. The pickup truck is shown in phantom lines.

It is to be understood that this invention embodies two of the above described assemblies, one of which is placed on each side of the desired vehicle to which the camper is to be secured, the camper including two of the just-mentioned assemblies. FIGURE 1 of the accompanying drawings illustrates this invention when it is adapted to any pickup truck; FIGURE 2 illustrates this invention when it is adapted to a vehicle of the sedan type. In the latter case, the two aforesaid inverted U-shaped frames 12 and 17 are replaced by two inverted L-shaped members 32, only one being shown in phantom lines in FIGURE 3 of the accompanying drawings. When this invention is used in the manner shown in the aforesaid FIGURE 1 of the drawings, a canvas cover 33 is placed over the same. It should be noted at this time that due to the length of the body of the vehicle behind the front door, the removal of the two front doors of the vehicle may be necessary in some cases. This removal of the doors can very easily be done, as will be fully understood by those experienced in the automotive arts, and no description for this operation need by given in this specification.

This novel invention of a camper is carried in its collapsed form. It is completely disassembled when not in use and is carried in a container of any desired configuration either in the vehicle on which the camper is mounted, or is suitably attached to the outside of the vehicle. The container is not shown in any of the views of the accompanying drawings since this is not an actual part of the invention and no claim is made for the detailed construction of the same.

This invention, as it has now been described, is seen to fulfill all of the objects as has been previously set forth herein. The invention is subject to any and all changes and/or modifications one may care to make in so long as the changes and/or modifications fall within the scope and intent of the appended claims. For example, the material from which the assemblies are made can be of wood, metal, or any other substance and of any desired cross-section. This invention can also be produced in any desired size.

What I now claim as new and desire to secure by Letters Patent is:

1. In a portable camper unit: an elongated, first frame; a pair of brackets, each bracket having an extension and hook means at one end thereof for removably hooking over a side extremity of a vehicle, whereby the brackets can be releasably attached to one side of the vehicle at spaced, operative locations thereof, the extensions of the brackets being above ground and projecting laterally from a vehicle when the brackets are in their operative locations thereon, said first frame being positionable on the extensions and in spanning relationship thereto, whereby the brackets will support the first frame on the vehicle side; a pair of second frames secured to the first frame at spaced positions thereon and extending upwardly therefrom; and means interconnecting the second frames adjacent to their upper ends, said second frames and said interconnecting means defining cover mounting structure for the first frame.

2. In a portable camper unit as set forth in claim 1, wherein said second frames are pivotally mounted to the first frames for movement into a nested position with respect thereto.

3. A portable camper unit as set forth in claim 1, wherein said first frame has a number of releasably interconnected sections, whereby the first frame can be assembled and disassembled.

4. In a portable camper unit as set forth in claim 1, wherein is included a flexible cover positionable on said mounting structure to at least partially enclose the space immediately above the first frame.

5. In a portable camper unit as set forth in claim 1, wherein is included means releasably interconnecting the extensions and the first frame to hold the latter against any movement relative to the brackets.

6. In a portable camper unit as set forth in claim 1, wherein each second frame has an inverted, U-shaped configuration when the same extends upwardly from the first frame to present a bight and a pair of spaced sides, said interconnecting means including a number of rods releasably secured to the bights of said second frames.

7. In a portable camper unit as set forth in claim 1, wherein is provided another first frame and a second pair of brackets for supporting the other first frame on the opposite side of the vehicle, said other first frame having a pair of second frames coupled thereto and extending upwardly therefrom, there being means interconnecting the last-mentioned second frames adjacent to their upper ends to present therewith a cover mounting structure.

8. In a portable camper unit as set forth in claim 7, wherein is provided a flexible cover positionable on the mounting structures to at least partially enclose the spaces immediately above the first frames and to at least partially span the distance therebetween.

References Cited

UNITED STATES PATENTS

| | | | |
|---|---|---|---|
| 526,866 | 10/1894 | Looney | 5—119 |
| 3,400,968 | 9/1968 | Smith | 296—23 |
| 2,502,024 | 3/1950 | Poche | 296—23.1 |
| 3,057,655 | 10/1962 | Weil | 296—20 |
| 2,869,146 | 1/1959 | Allison | 5—118 |

PHILIP GOODMAN, Primary Examiner

U.S. Cl. X.R.

5—118; 135—1